United States Patent
Sohn et al.

(10) Patent No.: US 7,804,569 B2
(45) Date of Patent: Sep. 28, 2010

(54) PANEL ASSEMBLY HAVING A COMMON ELECTRODE COMPRISING A PLURALITY OF DOMAIN DIVIDING MEMBERS OVERLAPPING GATE LINES AND WHEREIN THE GATE LINES OVERLAP A PIXEL ELECTRODE

(75) Inventors: Ji-Won Sohn, Seoul (KR); Jin-Won Park, Suwon (KR); Seon-Ah Cho, Busan (KR); Mee-Hye Jung, Suwon (KR); Sung-Hoon Yang, Yongin (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 374 days.

(21) Appl. No.: 11/943,400

(22) Filed: Nov. 20, 2007

(65) Prior Publication Data

US 2008/0117373 A1    May 22, 2008

(30) Foreign Application Priority Data

Nov. 21, 2006    (KR) .................... 10-2006-0115471

(51) Int. Cl.
*G02F 1/1343* (2006.01)

(52) U.S. Cl. ..................... 349/139; 349/39; 349/129; 349/144

(58) Field of Classification Search .............. 349/39, 349/129, 139, 143, 144
See application file for complete search history.

(56) References Cited

U.S. PATENT DOCUMENTS

| | | | |
|---|---|---|---|
| 5,822,027 A * | 10/1998 | Shimada et al. ............... | 349/39 |
| 6,816,220 B2 * | 11/2004 | Baek et al. .................. | 349/139 |
| 7,064,803 B2 * | 6/2006 | Okazaki et al. ............. | 349/178 |
| 7,167,225 B2 * | 1/2007 | Kim ........................... | 349/139 |
| 2005/0030459 A1 * | 2/2005 | Song et al. .................. | 349/129 |

FOREIGN PATENT DOCUMENTS

| | | |
|---|---|---|
| JP | 2000-171830 | 6/2000 |
| JP | 2002-303873 | 10/2002 |
| JP | 2006-154105 | 6/2006 |

* cited by examiner

*Primary Examiner*—John Heyman
(74) *Attorney, Agent, or Firm*—H. C. Park & Associates, PLC

(57) ABSTRACT

A panel assembly includes a gate wire, a data wire, a plurality of pixel electrodes, a liquid crystal layer, and a common electrode. The gate wire includes a plurality of gate lines and the data wire includes a plurality of data lines crossing and insulated from the gate lines. The pixel electrodes are insulated from each other and disposed on the data wire. The liquid crystal layer is disposed on the pixel electrodes and includes liquid crystal molecules, and a common electrode is disposed on the liquid crystal layer. The gate lines cross a center of the pixel electrodes, and the common electrode includes a plurality of cutting patterns that overlap the gate lines.

20 Claims, 5 Drawing Sheets

PANEL ASSEMBLY HAVING A COMMON ELECTRODE COMPRISING A PLURALITY OF DOMAIN DIVIDING MEMBERS OVERLAPPING GATE LINES AND WHEREIN THE GATE LINES OVERLAP A PIXEL ELECTRODE

CROSS-REFERENCE TO RELATED APPLICATION

This application claims priority from and the benefit of Korean Patent Application No. 10-2006-0115471, filed on Nov. 21, 2006, which is hereby incorporated by reference for all purposes as if fully set forth herein.

BACKGROUND OF THE INVENTION

1. Field of the Invention

Apparatuses and methods consistent with the present invention relate to a panel assembly, and more particularly, to a panel assembly that may provide enhanced light transmittance and improved visibility.

2. Discussion of the Background

A display panel is employed in a display device and displays an image with a plurality of pixels. A pixel is the smallest unit to display an image. Among various display panels, a liquid crystal display (LCD) panel, which is thin and light, has been developed along with the rapid advancement in semiconductor technologies.

The LCD panel generally includes an upper display substrate including a common electrode and a color filter, a lower display substrate including a thin film transistor and a pixel electrode, and liquid crystals interposed between the upper and lower display substrates. The pixel electrode and the common electrode receive different electric potentials to form an electric field, thereby adjusting the alignment of liquid crystal molecules and the light transmittance to form an image.

The LCD panel may provide a narrow viewing angle. To realize a wide viewing angle, a liquid crystal display panel in a vertically aligned (VA) mode has been developed, in which a single pixel is divided into a plurality of domains. In the VA mode, the longer side of the liquid crystal molecules is vertically aligned with respect to the upper and lower substrates when the electric field is not applied. The liquid crystal molecules in the VA mode may have various orientations near a fringe field in the divided plurality of domains, thereby enhancing the viewing angle.

However, if a medium or small liquid crystal display panel has a pixel that is divided into a plurality of domains, the aperture ratio becomes too small and accordingly, the light transmittance decreases. Thus, the brightness of the display panel also decreases.

SUMMARY OF THE INVENTION

The present invention provides a panel assembly which may provide enhanced light transmittance.

Additional features of the present invention will be set forth in part in the description which follows and, in part will be apparent from the description, or may be learned by practice of the present invention.

The present invention discloses a panel assembly including a gate wire, a data wire, a plurality of pixel electrodes, a liquid crystal layer, and a common electrode. The gate wire includes a plurality of gate lines and the data wire includes a plurality of data lines crossing and insulated from the gate lines. The pixel electrodes are insulated from each other and disposed on the data wire. The liquid crystal layer is disposed on the pixel electrodes and includes liquid crystal molecules, and the common electrode is disposed on the liquid crystal layer. The gate lines cross a center of the pixel electrodes, and the common electrode includes a plurality of cutting patterns that overlap the gate lines.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
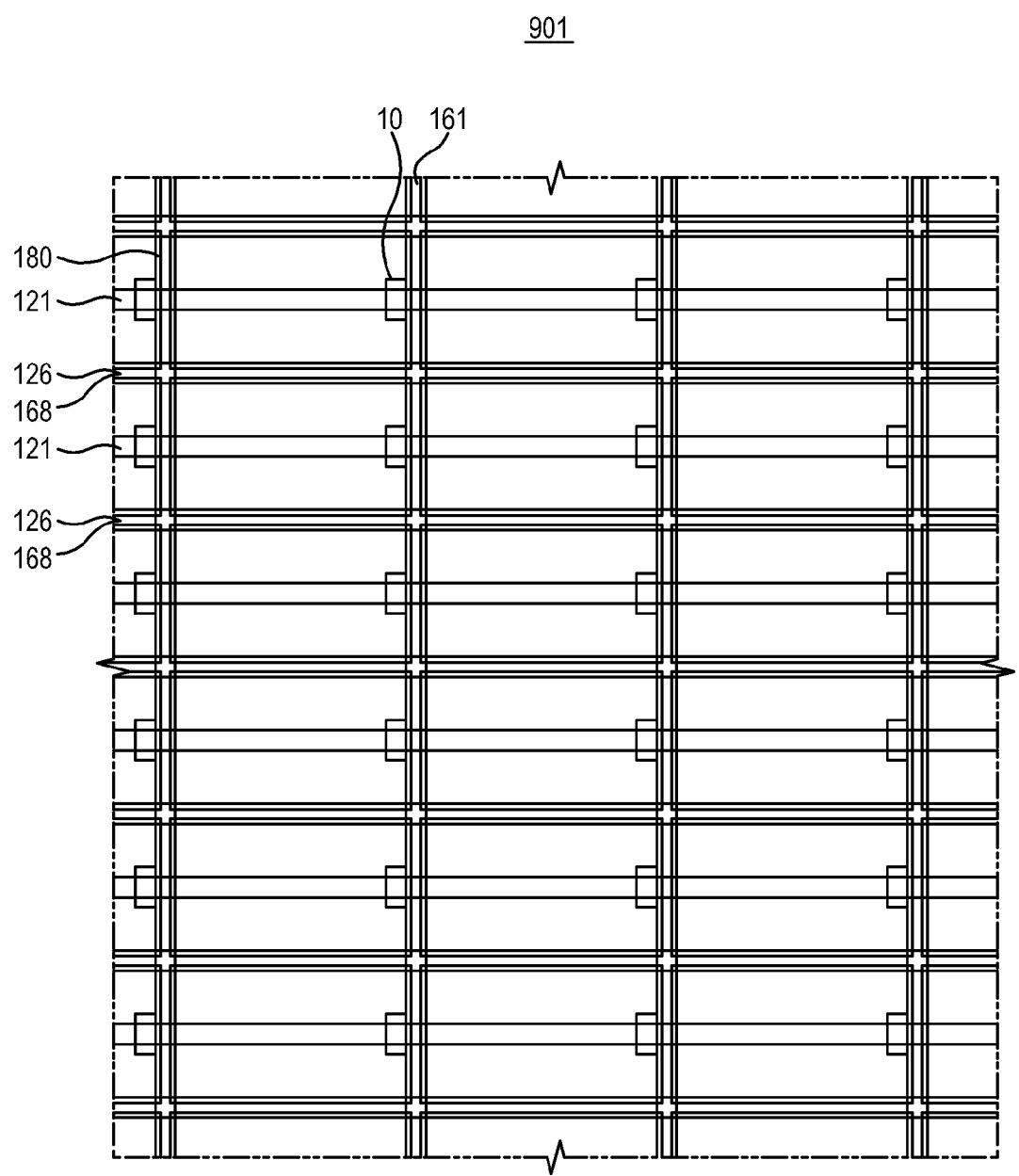
FIG. 1 is a schematic view of a first display substrate of a panel assembly according to a first exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

The accompanying drawings show a panel assembly having an amorphous silicon (a-Si) thin film transistor (TFT) formed by five mask processes.

The accompanying drawings show a liquid crystal display panel assembly in a vertically aligned (VA) mode.

To clarify the present invention, unrelated descriptions are avoided.

Figure 2:
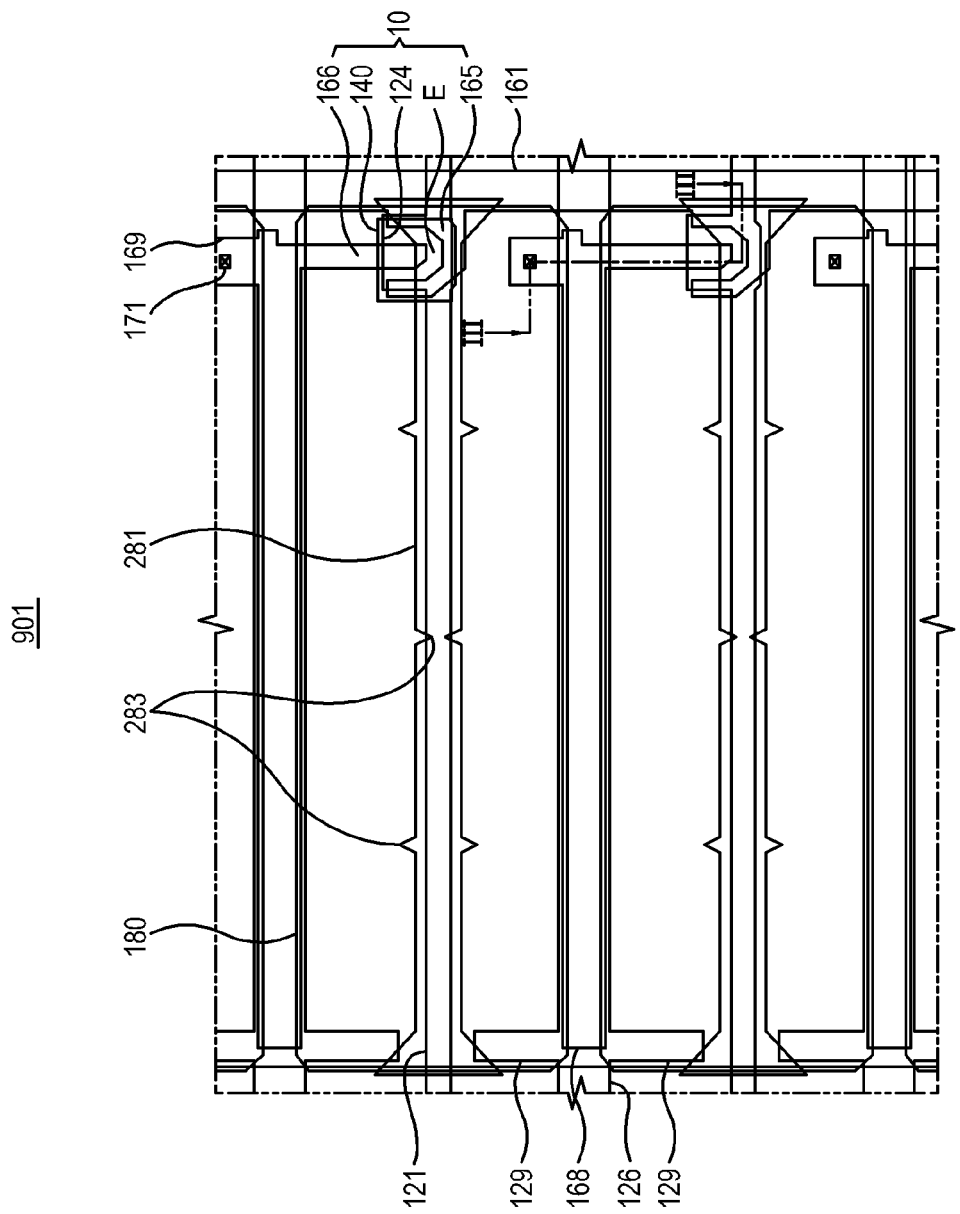
FIG. 2 is an enlarged view of a pixel that includes a thin film transistor in FIG. 1.
Figure 3:
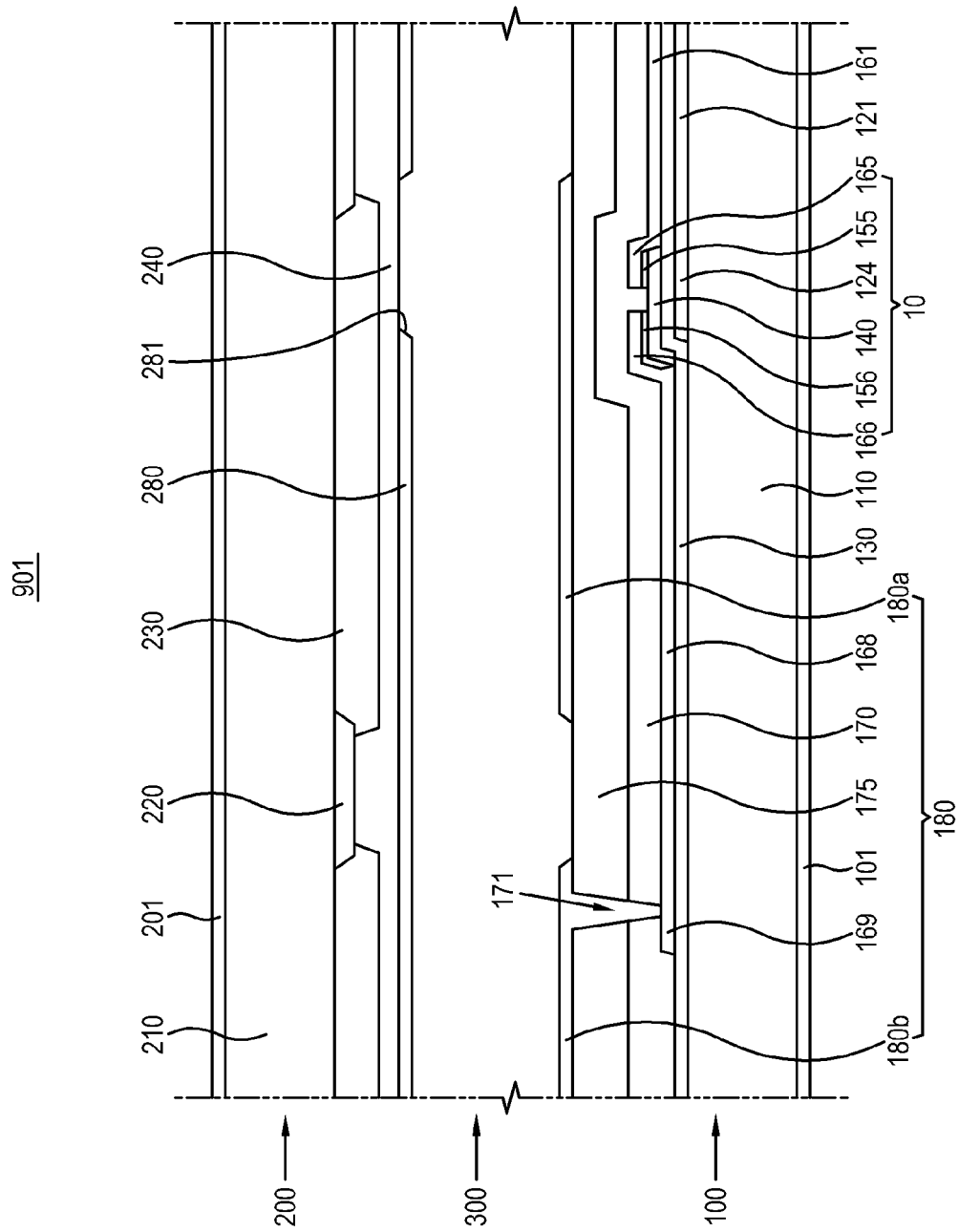
FIG. 3 is a sectional view of the panel assembly having the first display substrate, taken along line III-III in FIG. 2.

FIG. 1 is a schematic view of a first display panel 100 of a panel assembly 901 according to a first exemplary embodiment of the present invention. FIG. 2 is an enlarged view of a pixel having a thin film transistor in FIG. 1. A pixel refers to the smallest unit to display an image. The pixel's shape may correspond to a pixel electrode 180. FIG. 2 shows a cutting pattern 281 of a common electrode 280 formed in a second display panel 200, which faces the first display panel 100. FIG. 3 is a sectional view of the panel assembly 901 including the first display panel 100 and the second display panel 200, taken along line III-III in FIG. 2.

The panel assembly 901 according to the first exemplary embodiment of the present invention includes a first display panel 100, a second display panel 200 that faces the first display panel 100, and a liquid crystal layer 300 that is formed between the first and second display panels 100 and 200 and includes a plurality of liquid crystal molecules. An alignment layer (not shown) may be formed in the first display panel 100 and the second display panel 200, respectively. The alignment layer vertically aligns the liquid crystal molecules of the liquid crystal layer 300 with respect to the first and second display panels 100 and 200.

Hereinafter, the first display panel 100 will be described in detail.

A first substrate 110 includes a transparent material such as glass, quartz, ceramic, or plastic.

Gate wires 121, 124, 126, and 129 are formed on the first substrate 110. The gate wires 121, 124, 126, and 129 include a plurality of gate lines 121, a plurality of gate electrodes 124 branched from the gate lines 121, a plurality of first storage electrode lines 126 in parallel with the gate lines 121, and a plurality of shielders 129 branched from the first storage electrode lines 126. Alternatively, the shielders 129 may be branched from the gate lines 121 or may be formed independently.

The gate wires 121, 124, 126, and 129 include metal, such as Al, Ag, Cr, Ti, Ta, Mo, or an alloy thereof FIG. 3 shows the gate wires 121, 124, 126, and 129 as a single layer. Alternatively, the gate wires 121, 124, 126, and 129 may include multiple layers including metal layers, such as Cr, Mo, Ti, Ta, or an alloy thereof, which have good physical and chemical properties, and metal layers such as Al series or Ag series, which have low resistivity. Otherwise, the gate wires 121, 124, 126, and 129 may include various metals or conductive materials and multiple layers may be patterned under the same etching conditions.

A gate insulating layer 130 is formed on the gate wires 121, 124, 126, and 129, and includes silicon nitride ($SiN_x$).

Data wires 161, 165, 166, 168, and 169 are formed on the gate insulating layer 130. The data wires 161, 165, 166, 168, and 169 include a plurality of data lines 161 crossing the gate lines 121, a plurality of source electrodes 165 branched from the data lines 161, a plurality of second storage electrode lines 168 overlapping the parallel first storage electrode lines 126 and spaced apart from the data lines 161, and a plurality of drain electrodes 166 having a first side facing the source electrodes 165 and a second side connected to the second storage electrode lines 168. The data wires 161, 165, 166, 168, and 169 further include a plurality of connectors 169 branched from the second storage electrode lines 168. The connectors 169 extend from the second storage electrode lines 168 in a direction opposite the drain electrodes 166.

The data wires 161, 165, 166, 168, and 169 include a conductive material such as chrome, molybdenum, aluminum, or an alloy thereof. The data wires 161, 165, 166, 168, and 169 may include a single layer or multiple layers.

A semiconductor layer 140 is formed between the gate insulating layer 130 of the gate electrodes 124, and the source electrodes 165 and the drain electrodes 166. Here, the gate electrodes 124, the source electrodes 165, and the drain electrodes 166 serve as three electrodes of a thin film transistor 10. The semiconductor layer 140 formed between the source electrodes 165 and the drain electrodes 166 defines a channel region E of the thin film transistor 10.

Ohmic contact members 155 and 156 are formed between the semiconductor layer 140 and the source electrode 165 and the drain electrode 166, respectively, to reduce contact resistance therebetween. The ohmic contact members 155 and 156 include amorphous silicon highly doped with silicide or an n-type dopant.

A passivation layer 170 is formed on the data wires 161, 165, 166, 168, and 169. The passivation layer 170 includes an insulating material with low permittivity, such as a-Si:C:O and a-Si:O:F, formed by a plasma enhanced chemical vapor deposition (PECVD) or an inorganic insulating material, such as silicon nitride or silicon oxide.

An organic layer 175 is formed on the passivation layer 170. The organic layer 175 is highly planar and photosensitive. The organic layer 175 limits the electrical capacitance formed between the data lines 161 and the pixel electrode 180.

The plurality of pixel electrodes 180 is formed on the organic layer 175. The pixel electrodes 180 include a transparent conductive material, such as indium tin oxide (ITO) or indium zinc oxide (IZO), or an opaque conductive material, such as aluminum having good light reflection. One hundred and twenty-eight or more pixel electrodes 180 are formed in every square inch of the panel assembly. The pixel electrodes 180 receive voltages through a reverse driving method, i.e., the pixel electrodes 180 receive voltages having opposite polarities.

The passivation layer 170 and the organic layer 175 include a plurality of contact holes 171 that expose a part of the connectors 169. The pixel electrodes 180 and the connectors 169 are connected to each other through the contact holes 171.

The gate lines 121 cross a center of the pixel electrodes 180. The data lines 161 are formed along a first side of the pixel electrodes 180. The first storage electrode lines 126 and the second storage electrode lines 168 are formed along a second side of the pixel electrodes 180 adjacent to the first side of the pixel electrodes 180.

The gate lines 121 are spaced apart from the first storage electrode lines 126 as far as 10 µm to 25 µm. If the distance between the gate lines 121 and the first storage electrode lines 126 is shorter than 5 µm, the aperture ratio becomes too small, thereby lowering light transmittance. Conversely, if the distance between the gate lines 121 and the first storage electrode lines 126 is longer than 25 µm, the response speed of the panel assembly 901 may become significantly slower.

The gate electrodes 124 are arranged at the first side of the pixel electrodes 180 adjacent to the data lines 161. The shielders 129 are arranged at the opposite side of the pixel electrodes' 180 first side. The shielders 129 shield a texture, which may be generated by a fringe field formed along edges of the pixel electrodes 180 adjacent to the data lines 161. Texture refers to a dark space that appears when fringe fields in different directions collide with each other, thereby distorting the alignment of the liquid crystal molecules.

The drain electrodes 166 and the second storage electrode lines 168, and the second storage electrode lines 168 and the connectors 169 are connected to each other at the first side of the pixel electrodes 180 along with the gate electrodes 124. With the foregoing configuration, the drain electrodes 166, the gate electrodes 124, the source electrodes 165, and the connectors 169 cover the texture, which may be generated by the fringe field formed in the pixel electrodes 180 adjacent to the data lines 161.

That is, the texture generated along the first side of the pixel electrodes 180 adjacent to the data lines 161 may be covered by the electrodes of the thin film transistor 10, while the texture generated along the opposite side thereof may be covered by the shielders 129.

The shielders 129 have a width, measured in a direction parallel to the gate lines 121, ranging from 5 μm to 20 μm. The width of the shielders 129 is set in consideration of the size of the texture formed along the edges of the pixel electrodes 180.

The thin film transistor 10 does not supply a voltage to the pixel electrode 180a in the pixel where the thin film transistor 10 is formed but does supply a voltage to a neighboring pixel electrode 180b connected to the drain electrode 166 through the connector 169.

Hereinafter, the second display panel 200 will be described in detail.

A second substrate 210 includes a transparent material such glass, quartz, ceramic, or plastic.

A light blocking member 220 is formed on the second substrate 210. The light blocking member 220 includes an opening that faces the pixel electrodes 180 of the first display panel 100 and blocks light leaking from neighboring pixels. The light blocking member 220 is formed corresponding to the thin film transistor 10 to block light from being incident on the semiconductor layer 140 of the thin film transistor 10. The light blocking member 220 may include a photosensitive organic material and a black pigment. The black pigment may include carbon black or titanium oxide.

Color filters 230, which have red, green, or blue color, may be sequentially formed on the second substrate 210 having the light blocking member 220. The color of the color filters 230 is not limited to the three colors and may vary. The light blocking members 220 may be formed on a boundary of the color filters 230, but are not limited thereto. Alternatively, the color filters 230 may partially overlap each other, and may block light like the light blocking member 220. In this case, the light blocking member 220 may be omitted.

A planarization layer 240 may optionally be formed on the light blocking member 220 and the color filters 230.

The common electrode 280 may be formed on the planarization layer 240. The common electrode 280 forms an electric field together with the pixel electrodes 180. The common electrode 280 includes a transparent conductive material such as ITO or IZO.

The common electrode 280 includes a cutting pattern 281 that divides the pixel electrodes 180. That is, the cutting pattern 281 divides the pixel electrodes 180 into two domains and overlaps the parallel gate lines 121. The cutting pattern 281 has a width ranging from 8 μm to 12 μm. If the width of the cutting pattern 281 is narrower than 8 μm, it is difficult to control the alignment of the liquid crystal molecules on the pixel electrodes 180. Meanwhile, if the width of the cutting pattern 281 is wider than 12 μm, the aperture ratio decreases, lowering the light transmittance. The cutting pattern 281 includes at least one notch 283. As shown in FIG. 2, the cutting pattern 281 includes three notches 283, which are alternately arranged in an opposite direction. The notches 283 formed in the cutting pattern 281 allow the liquid crystal molecules to be aligned more stably.

The first display panel 100 further includes a first polarizing layer 101 that is formed on an external surface of the first substrate 110. The second display panel 200 further includes a second polarizing layer 201 that is formed on an external surface of the second substrate 210. Polarizing axes of the first polarizing layer 101 and the second polarizing layer 201 are perpendicular to each other and form 45° angles with the gate lines 121.

As the electric field is formed between the pixel electrodes 180 and the common electrode 280 with the foregoing configuration, the liquid crystal molecules in the respective domains are oriented toward the cutting pattern 281, i.e., in a direction perpendicular to the gate lines 121.

As the cutting pattern 281 of the common electrode 280 overlaps the gate lines 121, the size of the open region through which light is emitted from a single pixel electrode 180, may be increased. The increased aperture ratio may improve the light transmittance and brightness of the panel assembly 901.

Thus, a single pixel electrode 180 may be divided into two domains while ensuring the maximum aperture ratio. Also, the transmittance of light traveling through the panel assembly 901, as well as the viewing angle and visibility of the panel assembly 901, may be improved.

The texture formed along the edges of the pixel electrodes 180 adjacent to the data lines 161 may be covered, thereby preventing deterioration of the picture quality of the panel assembly 901.

Figure 4:
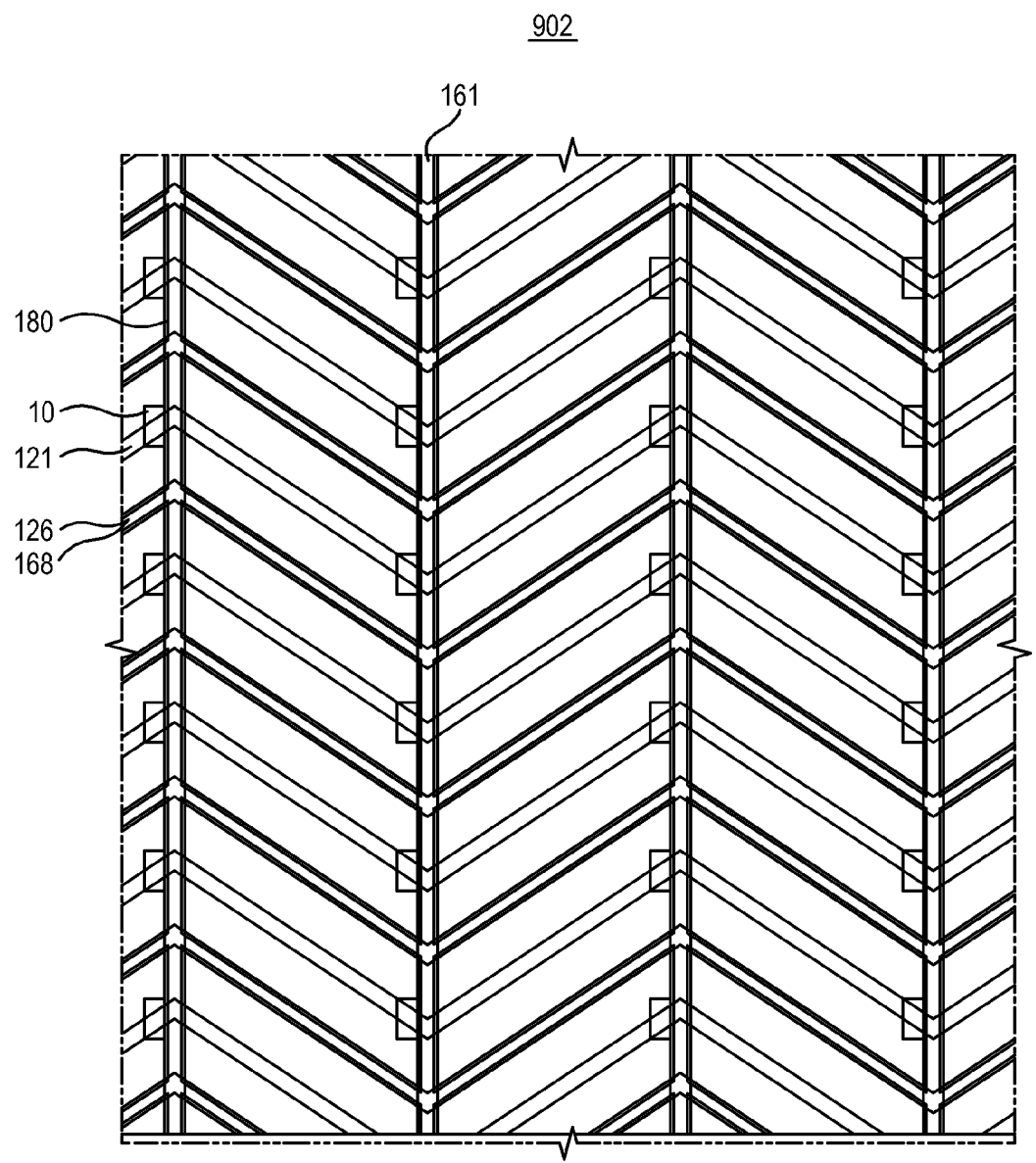
FIG. 4 is a schematic view of a first display substrate of a panel assembly according to a second exemplary embodiment of the present invention.

Hereinafter, a panel assembly 902 according to a second exemplary embodiment of the present invention will be described with reference to FIG. 4.

As shown therein, a gate line 121, a first storage electrode line 126, and a second storage electrode line 168 are arranged diagonally and form 45° angles with a data line 161. The gate line 121, the first storage electrode line 126, and the second storage electrode line 168 are arranged in a zigzag pattern corresponding to the points at which they cross the data line 161. That is, an extended direction of the gate line 121, the first storage electrode line 126, and the second storage electrode line 168 are arranged alternately.

Returning to FIG. 3, polarizing axes of a first polarizing layer 101 formed on an external surface of a first substrate 110 and a second polarizing layer 201 formed on an external surface of a second substrate 210 are perpendicular to each other. One of the polarizing axes of the first and second polarizing layers 101 and 201 is arranged parallel to the data line 161.

With the foregoing configuration, the panel assembly 902 may provide an enhanced viewing angle and better visibility, while maintaining improved light transmittance. When a single pixel electrode 180 is divided into two domains, left and right visibility is lower than upper and lower visibility when the gate line 121 is formed in a transverse direction. On the other hand, when the gate lines 121 are arranged in the zigzag pattern while maintaining 45° angles with the data line 161, the overall viewing angle and visibility may be improved in all directions.

Figure 5:
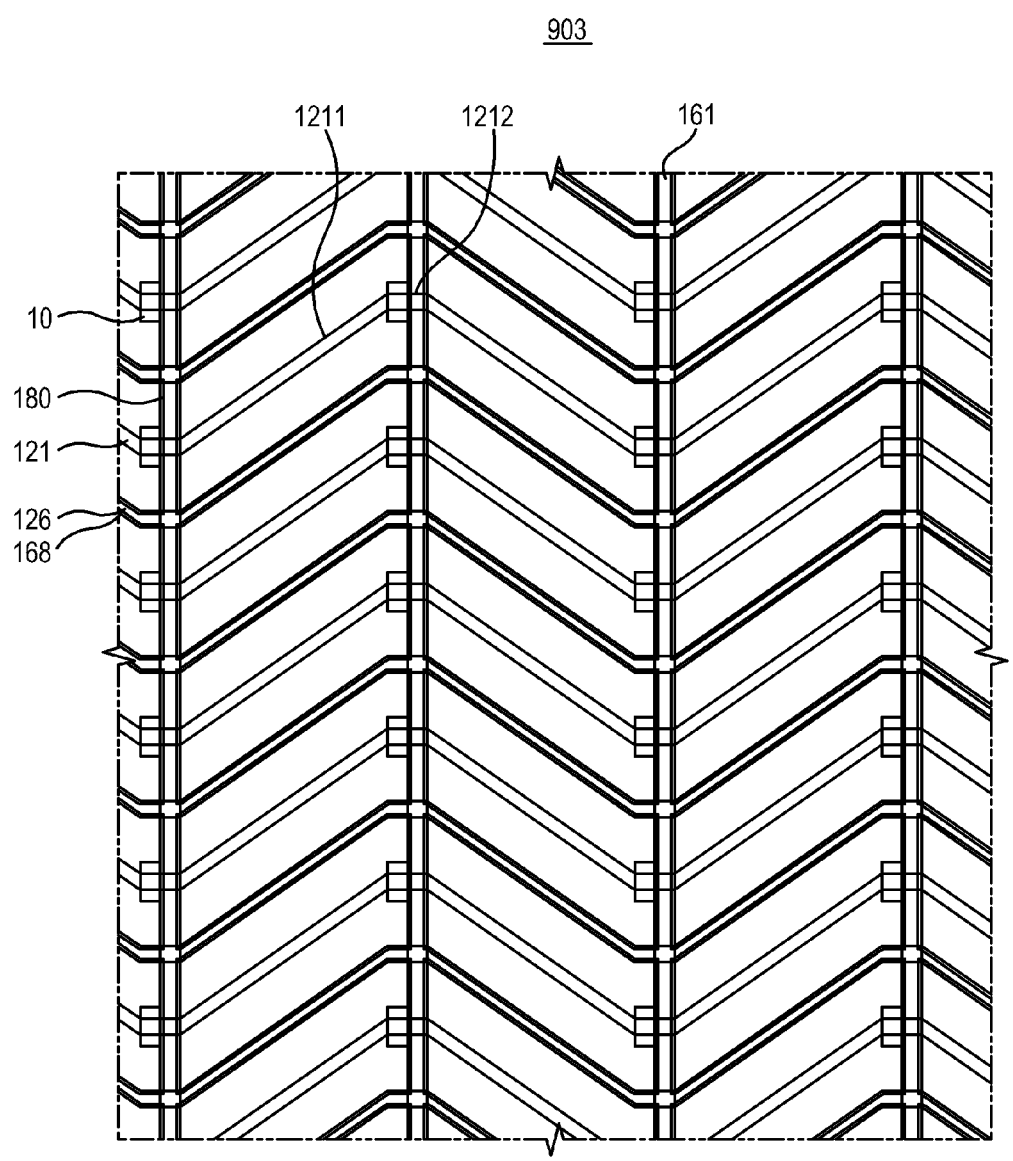
FIG. 5 is a schematic view of a first display substrate of the panel assembly according to a variation of the second exemplary embodiment of the present invention.

Hereinafter, a panel assembly 903 according to a variation of the second exemplary embodiment of the present invention will be described with reference to FIG. 5.

As shown therein, a gate line 121 includes a diagonal region 1211 forming a 45° angle with a data line 161, and a crossing region 1212 perpendicular to the data line 161. The diagonal region 1211 is arranged in a zigzag pattern corresponding to a position where the gate line 121 crosses with the data line 161. That is, an orientation of the diagonal region 1211 is alternately arranged. A first storage electrode line 126 and a second storage electrode line 168 are formed in the same pattern as the gate line 121.

With the foregoing configuration, overloading of the gate line 121 may be prevented. Thus, the viewing angle and the visibility of the panel assembly 903 may be improved more stably.

As described above, the present invention provides a panel assembly that may have enhanced light transmittance.

Also, the present invention provides a panel assembly that may have an enhanced viewing angle and better visibility.

Further, the present invention provides a panel assembly that may prevent deterioration of picture quality due to texture.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A panel assembly, comprising:
   a plurality of gate lines;
   a plurality of data lines crossing and insulated from the gate lines;
   a plurality of pixel electrodes insulated from each other and disposed on the data lines;
   a liquid crystal layer disposed on the pixel electrodes, the liquid crystal layer comprising liquid crystal molecules; and
   a common electrode disposed on the liquid crystal layer, wherein the gate lines overlap the pixel electrodes, and wherein the common electrode comprises a plurality of domain dividing members overlapping the gate lines.

2. The panel assembly of claim 1, further comprising a plurality of first storage electrode lines disposed on the same layer as the gate lines.

3. The panel assembly of claim 2, further comprising a plurality of second storage electrode lines disposed along a second side of the pixel electrodes adjacent to the first side of the pixel electrodes and overlapping the first storage electrode lines.

4. The panel assembly of claim 2, wherein the data lines are arranged along a first side of the pixel electrodes, and
   the first storage electrode lines are arranged along a second side of the pixel electrodes adjacent to the first side of the pixel electrodes.

5. The panel assembly of claim 4, wherein the distance between one of the gate lines and the first storage electrode line adjacent to the gate line ranges from 10 µm to 25 µm.

6. The panel assembly of claim 4, further comprising:
   a plurality of shielders arranged along a third side of the pixel electrodes, the first side and the third side of the pixel electrodes being opposite sides of the pixel electrodes; and
   a plurality of gate electrodes branched from the gate lines and arranged along the first side of the pixel electrodes adjacent to the data lines.

7. The panel assembly of claim 6, wherein the shielders are branched from the first storage electrode lines.

8. The panel assembly of claim 6, wherein the shielders comprise a width ranging from 5 µm to 20 µm.

9. The panel assembly of claim 6, further comprising:
   a plurality of second storage lines;
   a plurality of source electrodes connected to the data lines; and
   a plurality of drain electrodes,
   wherein each drain electrode comprises a first end facing one of the source electrodes and a second end connected to one of the second storage electrode lines;
   the drain electrodes and the second storage electrode lines are connected to each other at the first side of the pixel electrodes.

10. The panel assembly of claim 9, further comprising a plurality of connectors extending from the second storage electrode lines in a direction opposite the drain electrodes, the connectors being connected to the pixel electrodes.

11. The panel assembly of claim 4, wherein each of the domain dividing members comprises a width ranging from 8 µm to 12 µm.

12. The panel assembly according to claim 11, wherein each of the domain dividing members comprises at least one notch.

13. The panel assembly according to claim 12, wherein notches are formed in opposite directions and are alternately arranged.

14. The panel assembly of claim 4, wherein the pixel electrodes comprise 128 or more pixel electrodes formed in every square inch of the panel assembly.

15. The panel assembly of claim 4, further comprising an organic layer disposed between the pixel electrodes and the data lines.

16. The panel assembly of claim 4, wherein the pixel electrodes receive a voltage through a reverse driving method.

17. The panel assembly of claim 1, further comprising:
   a first substrate, the first substrate comprising the gate lines, the data lines, and the pixel electrodes;
   a second substrate facing the first substrate, the second substrate comprising the common electrode;
   a first polarizing layer disposed on the first substrate; and
   a second polarizing layer disposed on the second substrate,
   wherein the first polarizing layer and the second polarizing layer comprise mutually perpendicular polarizing axes, and the polarizing axes form 45° angles with the gate lines.

18. The panel assembly of claim 1, further comprising:
   a first substrate, the first substrate comprising the gate lines, the data lines, and the pixel electrodes;
   a second substrate facing the first substrate, the second substrate comprising the common electrode;
   a first polarizing layer disposed on the first substrate; and
   a second polarizing layer disposed on the second substrate,
   wherein the first polarizing layer and the second polarizing layer comprise mutually perpendicular polarizing axes, and one of the polarizing axes is parallel to the data lines.

19. The panel assembly of claim 18, wherein the gate lines are arranged diagonally and form 45° angles with the data lines, and are formed in a zigzag pattern corresponding to positions where the gate lines cross the data lines.

20. The panel assembly of claim 18, wherein the gate lines comprise a diagonal region forming 45° angles with the data lines; and
   a crossing region perpendicular to the data lines,
   wherein the diagonal region is arranged in a zigzag pattern.

* * * * *